US012712263B2

(12) United States Patent
Su et al.

(10) Patent No.: US 12,712,263 B2
(45) Date of Patent: Aug. 18, 2026

(54) ANTENNA PHASE CONTROL METHOD AND DEVICE

(71) Applicant: Chiun Mai Communication Systems, Inc., New Taipei (TW)

(72) Inventors: Chia-Hung Su, New Taipei (TW); Lung-Ta Chang, New Taipei (TW); Chang-Ching Huang, New Taipei (TW); Shu-Wei Jhang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 443 days.

(21) Appl. No.: 18/215,238

(22) Filed: Jun. 28, 2023

(65) Prior Publication Data

US 2024/0039154 A1 Feb. 1, 2024

(30) Foreign Application Priority Data

Jul. 29, 2022 (CN) ......................... 202210908569.2

(51) Int. Cl.
*H01Q 3/38* (2006.01)
*H01Q 1/32* (2006.01)

(52) U.S. Cl.
CPC ............. *H01Q 3/38* (2013.01); *H01Q 1/3275* (2013.01)

(58) Field of Classification Search
CPC ........ G01S 19/36; G01S 19/22; G01S 19/396; G01S 19/14; H01Q 3/38; H01Q 1/3275; H01Q 1/3233; H01Q 3/30
See application file for complete search history.

(56) References Cited

U.S. PATENT DOCUMENTS 4,841,303 A * 6/1989 Anderson ................ H01Q 1/32 342/359
2003/0016172 A1 1/2003 Natsume et al.

FOREIGN PATENT DOCUMENTS

| | | | | | |
|---|---|---|---|---|---|
| CN | 107331967 A | | 11/2017 | | |
| CN | 108510771 A | | 9/2018 | | |
| CN | 109728438 A | | 5/2019 | | |
| CN | 110641392 A | | 1/2020 | | |
| CN | 113219873 A | | 8/2021 | | |
| CN | 113701753 A | * | 11/2021 | ............. | G01S 19/46 |
| JP | 02287180 A | * | 11/1990 | | |

OTHER PUBLICATIONS

DE112011105216T5, Miyamoto, May 15, 2014, all (Year: 2014).*
CN113820733A, Jinko, Dec. 21, 2021, see abstract (Year: 2021).*

* cited by examiner

*Primary Examiner* — Curtis A Kuntz
(74) *Attorney, Agent, or Firm* — ScienBiziP, P.C.

(57) ABSTRACT

An antenna phase control method is applied to an antenna phase control device, the antenna disposed on a moving carrier to communicate with a satellite. The method includes obtaining an initial phase of the antenna, obtaining an instant rotation information of a steering wheel of the moving carrier and speed information of the moving carrier, calculating a compensation phase of the antenna according to the instant rotation information and the speed information, and adjusting the initial phase of the antenna according to the compensation phase. The present disclosure also provides an antenna phase control device. The present disclosure can calculate the antenna phase according to the direction information and the speed information of the moving carrier, so as to dynamically adjust the radiation direction of the antenna.

20 Claims, 12 Drawing Sheets

ANTENNA PHASE CONTROL METHOD AND DEVICE

CROSS-REFERENCE TO RELATED APPLICATIONS

The present application claims the benefit of and priority to Chinese patent application NO. 202210908569.2, field on Jul. 29, 2022, the entirety of which is incorporated herein by reference.

FIELD

The present disclosure relates to the antenna field, in particular to an antenna phase control method and device.

BACKGROUND

With the development of satellite communication technology, the vehicle-mounted antenna has been more widely used so that a vehicle can communicate with the low earth orbit (LEO) communication satellite through the vehicle-mounted antenna to access the network without the connection of the base station. The LEO satellite communication system is a highly directional communication system, when the vehicle-mounted antenna communicates with the LEO communication satellite, in order to maintain communication, the vehicle-mounted antenna and the LEO satellite need to maintain the docking of antenna beam azimuth angle. When the vehicle is driving, turning, going up and down, or even bumping the road surface will cause the antenna beam azimuth angle to shift instantaneously, affecting the communication quality between the vehicle and the LEO satellite.

Therefore, improvement is desired.

BRIEF DESCRIPTION OF THE DRAWINGS

Implementations of the present disclosure will now be described, by way of embodiments, with reference to the attached figures.

DETAILED DESCRIPTION

In the embodiment of the present disclosure, the words “first” and “second” are only used to distinguish different objects and cannot be understood as indicating or implying relative importance, or as indicating or implying order. For example, the first application and the second application are used to distinguish different applications, not to describe the specific order of applications.

Figure 1:
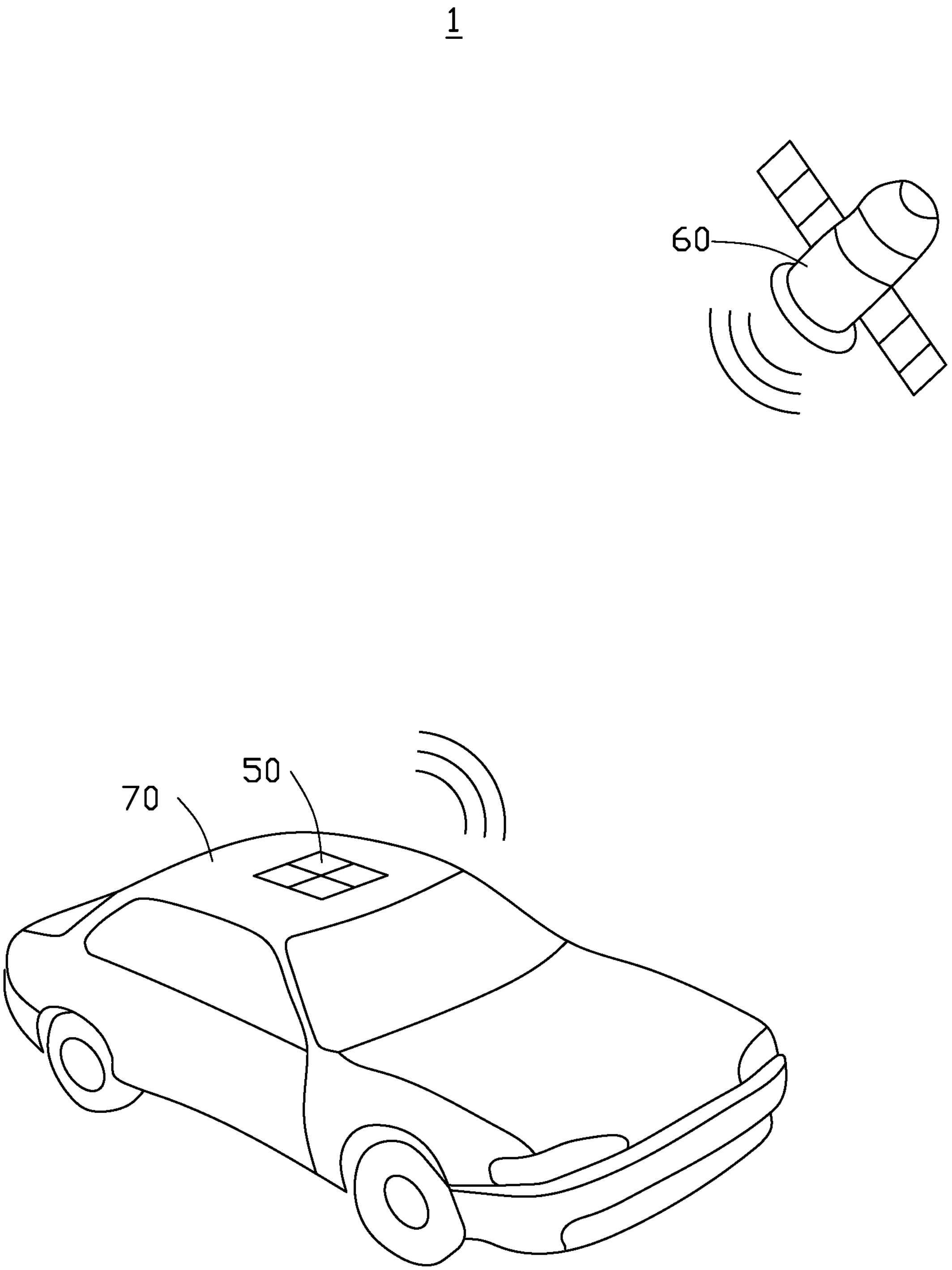
FIG. 1 is a schematic diagram of an embodiment of a communication system of the present disclosure.

FIG. 1 illustrates a communication system 1 in accordance with an embodiment of the present disclosure.

The communication system 1 includes a satellite 60 and a moving carrier 70. In some embodiments, the moving carrier 70 can be vehicle, ship, etc. The moving carrier 70 is equipped with an antenna assembly 50, the antenna assembly 50 is used to communicate with the satellite 60. In one embodiment, the satellite 60 may be a low earth orbit (LEO) satellite.

It can be understood that the antenna assembly 50 can be an array antenna. In some embodiments, the antenna assembly 50 may include a plurality of antenna elements. The communication quality of the antenna assembly 50 and the satellite 60 is associated with the signal radiation direction of the antenna assembly 50, the signal radiation direction of the antenna assembly 50 is associated with the signal radiation direction of each antenna element, and the signal radiation direction of each antenna element is associated with the phase value of each antenna element. Therefore, the present disclosure can control the signal radiation direction of the antenna assembly 50 by controlling the phase of the antenna element or the antenna assembly 50, thereby controlling the communication quality between the antenna assembly 50 and the satellite 60.

Figure 2A:
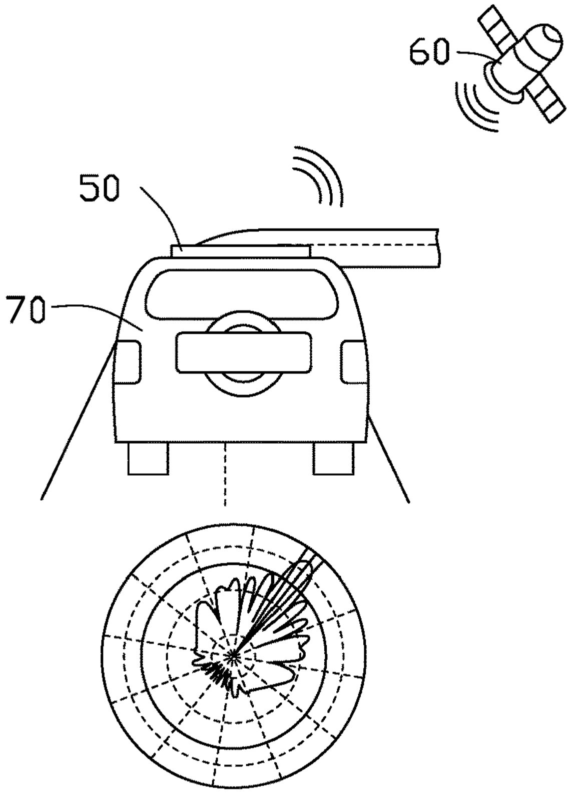
FIG. 2A and FIG. 2B are schematic diagrams of antenna radiation direction of a moving carrier in motion.
Figure 2B:
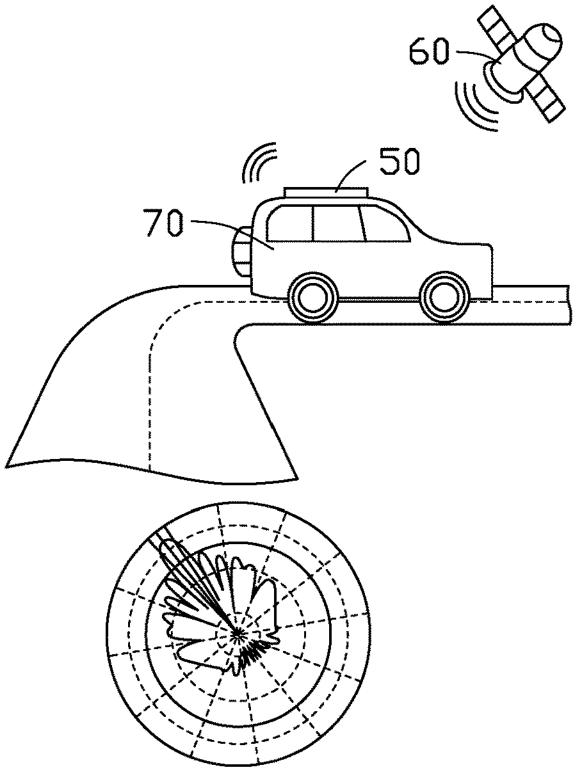

FIGS. 2A and 2B show the signal radiation direction of the antenna assembly 50 when the moving carrier 70 is moving. when the moving carrier 70 is moving in a straight line (for example, the vehicle is moving in a straight line) or stationary, the signal radiation direction of the antenna assembly 50 is a first direction, the first direction corresponds to the signal radiation direction of the satellite 60, and the communication quality between the antenna assembly 50 and the satellite 60 is better. When the moving carrier 70 changes direction (for example, the vehicle turns), the signal radiation direction of the antenna assembly 50 becomes a second direction, the second direction does not correspond to the signal radiation direction of the satellite 60, and the communication quality between the antenna assembly 50 and the satellite 60 will deteriorate.

Figure 3:
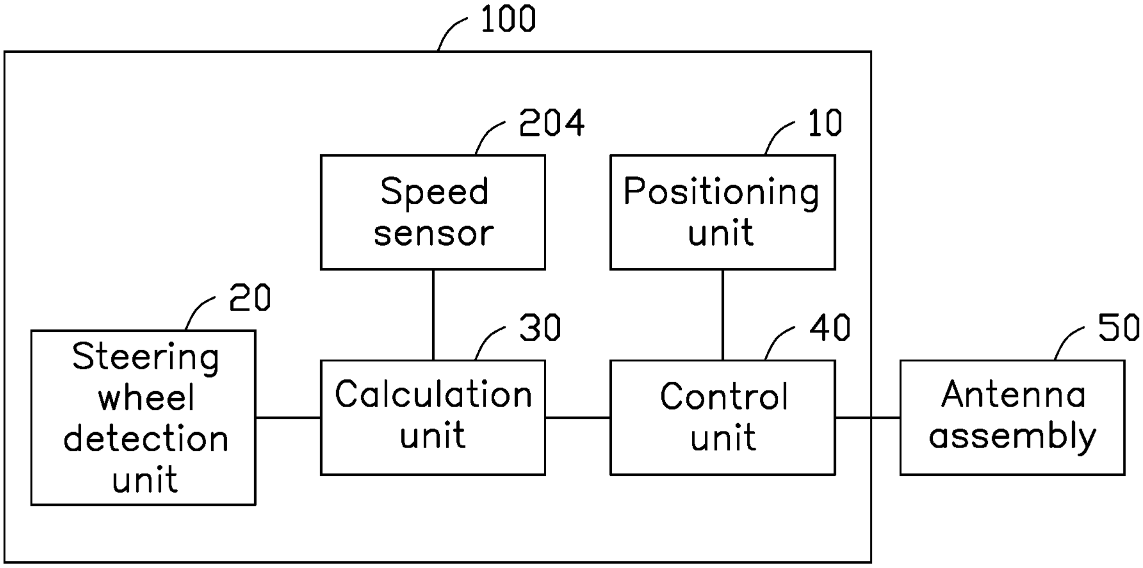
FIG. 3 is a schematic diagram of an embodiment of an antenna phase control device of the present disclosure.

FIG. 3 illustrates an antenna phase control device 100 in accordance with an embodiment of the present disclosure.

The antenna phase control device 100 is disposed on the moving carrier 70. The antenna phase control device 100 is electrically connected to the antenna assembly 50, and the antenna phase control device 100 is used to control the signal radiation direction of the antenna assembly 50. Specifically, the antenna phase control device 100 can control the phase value of the antenna assembly 50 to control the signal radiation direction of the antenna assembly 50.

The antenna phase control device 100 includes a positioning unit 10, a steering wheel detection unit 20, a calculation unit 30, a control unit 40 and a speed sensor 204. The positioning unit 10 is electrically connected to the control unit 40, the steering wheel detection unit 20 is electrically connected to the calculation unit 30, the calculation unit 30 is electrically connected to the control unit 40, and the control unit 40 is electrically connected to the antenna assembly 50.

The control unit 40 is used to obtain the initial phase of the antenna assembly 50. When the moving carrier 70 starts driving, the antenna assembly 50 can scan the satellite signal and establish a communication connection with the satellite 60. Optionally, the control unit 40 can obtain the satellite signal strength detected by the antenna assembly 50 and control the antenna assembly 50 to establish a communication connection with the satellite 60 with the strongest satellite signal strength. It can be understood that after the antenna assembly 50 establishes a communication connection with the satellite 60, the control unit 40 can obtain the initial phase of the antenna assembly 50 to obtain the initial radiation direction of the antenna assembly 50.

In some embodiments, the control unit 40 may be a central processing unit (CPU) or a data processing chip.

The positioning unit 10 is used to obtain the current location information of the moving carrier 70. For example, the positioning unit 10 can position the moving carrier 70 through the Global Positioning System (GPS), Global Navigation Satellite System (GLONASS), BeiDou Navigation Satellite System (BDS), and obtain the current location information of the moving carrier 70. In some embodiments, the positioning unit 10 may be a navigator, a locator, and the current location information may include the longitude, the latitude and the altitude of the moving carrier 70.

The positioning unit 10 transmits the current location information of the moving carrier 70 to the control unit 40, the control unit 40 can further control the antenna assembly 50 to establish a communication connection with different satellites 60 according to the current position information of the moving carrier 70.

The steering wheel detection unit 20 is used to obtain the instant rotation information of a steering wheel of the moving carrier 70. Optionally, the steering wheel detection unit 20 can obtain the instant rotation information of the steering wheel of the moving carrier 70 by detecting a rotation angle of the steering wheel. It can be understood that the steering wheel detection unit 20 can be, but not limited to, an angle sensor.

The speed sensor 204 is used to obtain the speed information of the moving carrier 70. It can be understood that the speed sensor 204 can be, but is not limited to, any of the magnetoelectric speed sensor, the hall-type speed sensor, and the photoelectric speed sensor.

The calculation unit 30 is used to calculate the compensation phase of the antenna assembly 50 according to the instant rotation information of the steering wheel and the speed information of the moving carrier 70. It can be understood that when the direction or speed of the moving carrier 70 changes during its movement, the radiation direction of the antenna assembly 50 may change. Therefore, the calculation unit 30 can calculate the compensation phase of the antenna assembly 50 according to the instant rotation information of the steering wheel of the moving carrier 70 and the speed information of the moving carrier 70, to compensate the initial phase of the antenna assembly 50, adjust the radiation direction of the antenna assembly 50, and improve the communication quality between the antenna assembly 50 and the satellite 60. In some embodiments, the calculation unit 30 can be a micro controller unit (MCU).

The control unit 40 is further used to adjust the initial phase of the antenna assembly according to the calculated compensation phase so that the antenna assembly 50 can dock with the satellite 60.

Figure 4:
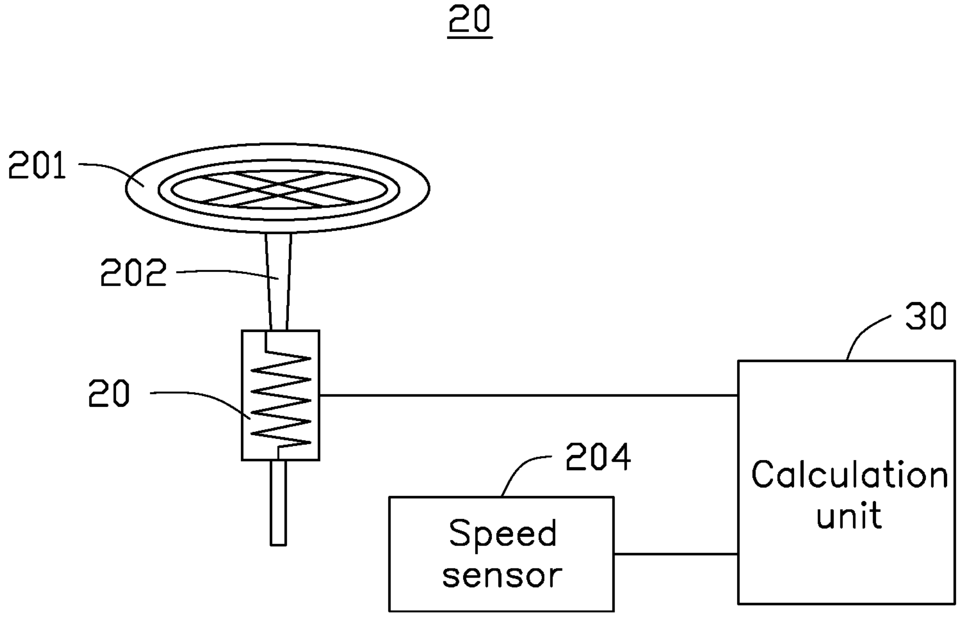
FIG. 4 is a partial structure diagram of the moving carrier of the present disclosure.

FIG. 4 is a partial structure diagram of the moving carrier 70 in accordance with an embodiment of the present disclosure.

In some embodiments, the moving carrier 70 may be a vehicle. The moving carrier 70 includes a steering wheel 201 and a steering rod 202. One end of the steering rod 202 is connected to the steering wheel 201, and the steering rod 202 rotates synchronously with the steering wheel 201. In some embodiments, the steering wheel detection unit 20 is disposed on the steering rod 202, which is not limited in the present disclosure. The steering wheel detection unit 20 is electrically connected to the calculation unit 30.

When the steering wheel 201 rotates, the steering rod 202 rotates synchronously, the steering wheel detection unit 20 can detect the rotation angle of the steering rod 202, obtain the instant rotation information of the steering wheel, and transmit the instant rotation information of the steering wheel 201 to the calculation unit 30.

In the embodiment, the calculation unit 30 is electrically connected to the speed sensor 204, and the speed sensor 204 is used to detect the speed information of the moving carrier 70. It can be understood that the speed sensor 204 can be, but is not limited to, any of the magnetoelectric speed sensor, the hall-type speed sensor, and the photoelectric speed sensor.

Figure 5:
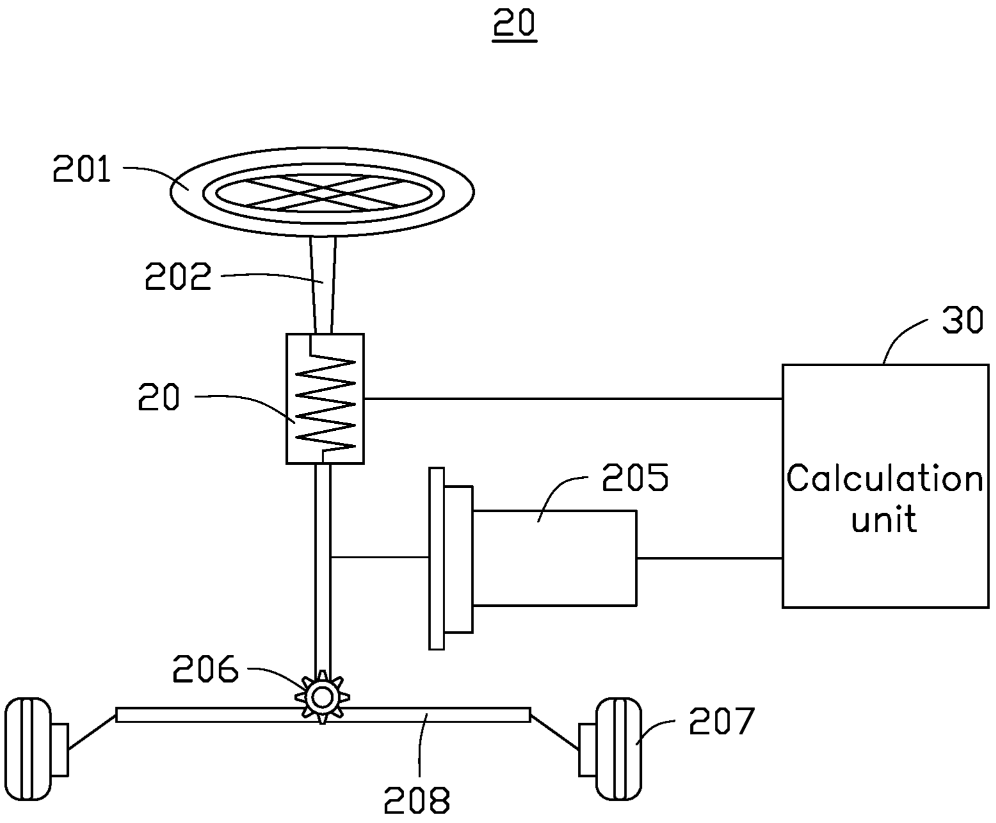
FIG. 5 is another partial structure diagram of the moving carrier of the present disclosure.

FIG. 5 is another partial structure diagram of the moving carrier 70 in accordance with an embodiment of the present disclosure.

The difference between this embodiment and FIG. 4 is that: the moving carrier 70 further includes a motor 205, a steering gear 206, a wheel 207 and a transmission member 208. The calculation unit 30 is electrically connected to the motor 205, the motor 205 is used to drive the steering gear 206 to rotate and drive the transmission member 208 to rotate, thereby driving the wheel 207 to rotate, so that the moving carrier 70 can run normally.

It can be understood that the movement speed of the moving carrier 70 is associated with the speed of the motor 205, so the calculation unit 30 can detect the speed of the motor 205 to obtain the speed information of the moving carrier 70.

Figure 6:
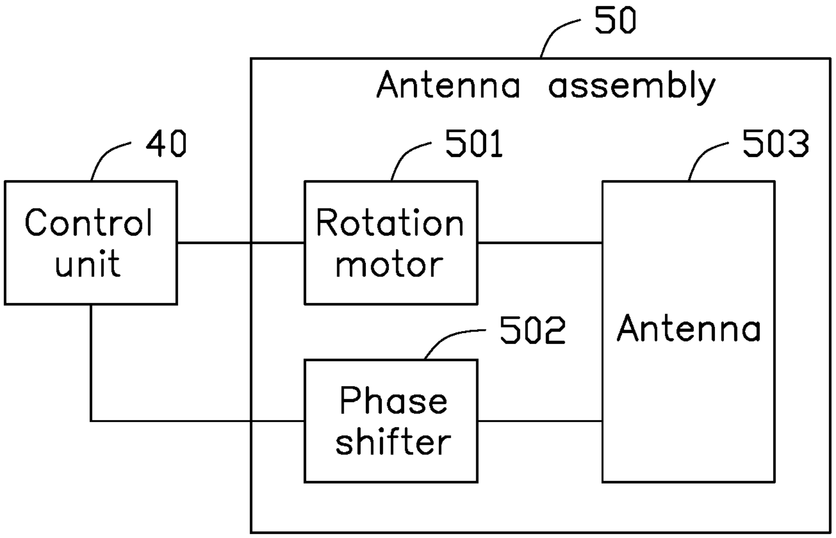
FIG. 6 is a schematic diagram of an antenna assembly of the present disclosure.

FIG. 6 illustrates the antenna assembly 50 in accordance with an embodiment of the present disclosure.

In some embodiments, the antenna assembly 50 includes a rotation motor 501, a phase shifter 502, and an antenna 503.

It can be understood that the antenna 503 can be an array antenna, and the antenna 503 can include a plurality of the antenna elements. The control unit 40 is electrically connected to the rotation motor 501 and the phase shifter 502, and the rotation motor 501 and the phase shifter 502 are electrically connected to the antenna 503.

The rotation motor 501 and the phase shifter 502 are used to adjust the phase of the antenna 503, and the antenna 503 is used to radiate signals to establish a communication connection with the satellite 60. Specifically, the control unit 40 can control the rotation motor 501 to drive the antenna 503 to rotate, so as to adjust the phase of the antenna 503, thereby greatly adjusting the radiation direction of the antenna 503. The phase shifter 502 can directly adjust the phase of the antenna 503, thereby slightly adjusting the radiation direction of the antenna 503.

After receiving the compensation phase output by the calculation unit 30, the control unit 40 can determine whether the difference between the compensation phase and the initial phase is greater than the preset threshold. If the difference between the compensation phase and the initial phase is greater than the preset threshold, the control unit 40 can output a control signal to the rotation motor 501 and the phase shifter 502, the rotary motor 501 and the phase shifter 502 can cooperate with each other according to the control signal to adjust the phase of the antenna 503; if the difference between the compensation phase and the initial phase is less than or equal to the preset threshold, the control unit 40 can output the control signal to the phase shifter 502, the phase shifter 502 can adjust the phase of the antenna 503 according to the control signal to adjust the radiation direction of the antenna assembly 50.

Figure 7:
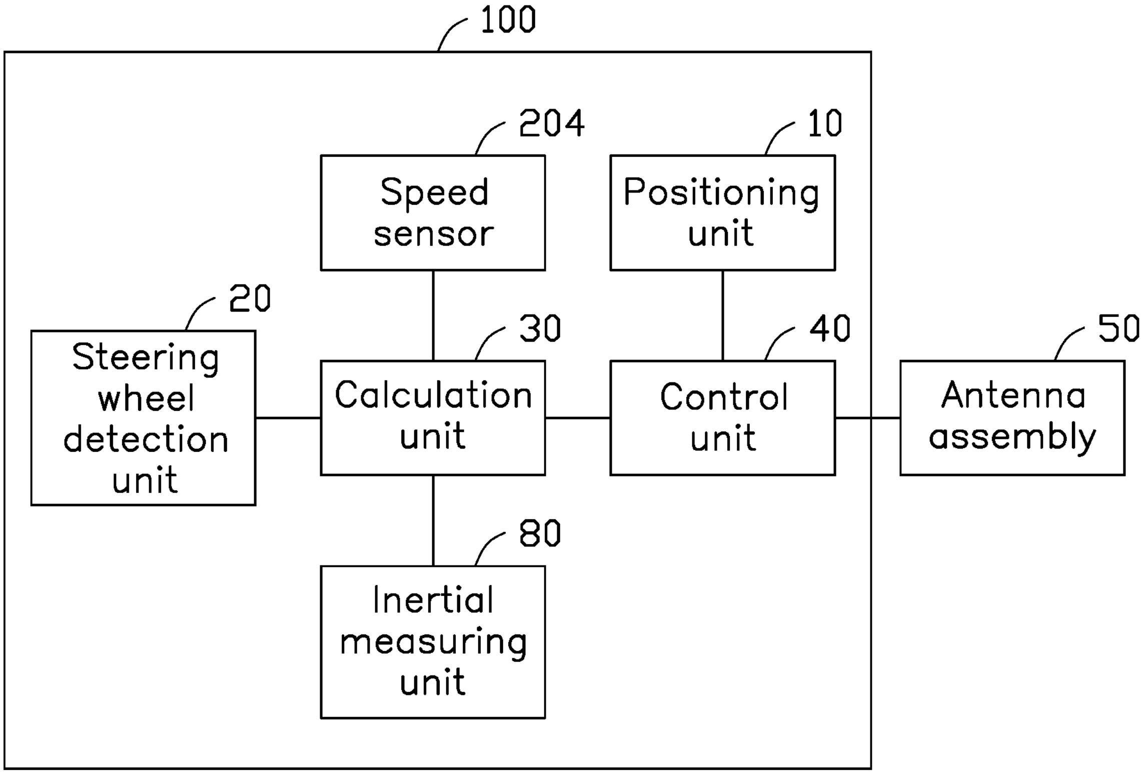
FIG. 7 is a schematic diagram of another embodiment of the antenna phase control device of the present disclosure.

FIG. 7 illustrates an antenna phase control device 200 in accordance with another embodiment of the present disclosure.

The difference between the antenna phase control device 200 provided by the embodiment and the antenna phase control device 100 in FIG. 3 is that: the antenna phase control device 200 further includes an inertial measuring unit 80. The inertial measuring unit 80 is electrically connected to the calculation unit 30, the inertial measuring unit 80 is used to obtain the current movement information of the moving carrier 70, the current movement information includes a current angle information of the moving carrier 70.

In some embodiments, the inertial measuring unit 80 includes an accelerometer, a gyroscope and a magnetometer. The accelerometer is used to measure the current acceleration of the moving carrier 70 (including gravity acceleration), the gyroscope is used to measure the angular velocity and the direction angle of the moving carrier 70, and the magnetometer is used to measure the magnetic field strength and the direction at the location of the moving carrier 70.

It can be understood that the current movement information of the moving carrier 70 measured by the inertial measuring unit 80 is more accurate and can better reflect the real direction information and the angle information of the moving carrier 70. In some embodiments, the angle information includes the pitch angle, the slope angle and the azimuth information of the moving carrier 70.

The calculation unit 30 can calculate the compensation phase of the antenna assembly 50 according to the current movement information of the moving carrier 70 output by the inertial measuring unit 80.

Figure 8:
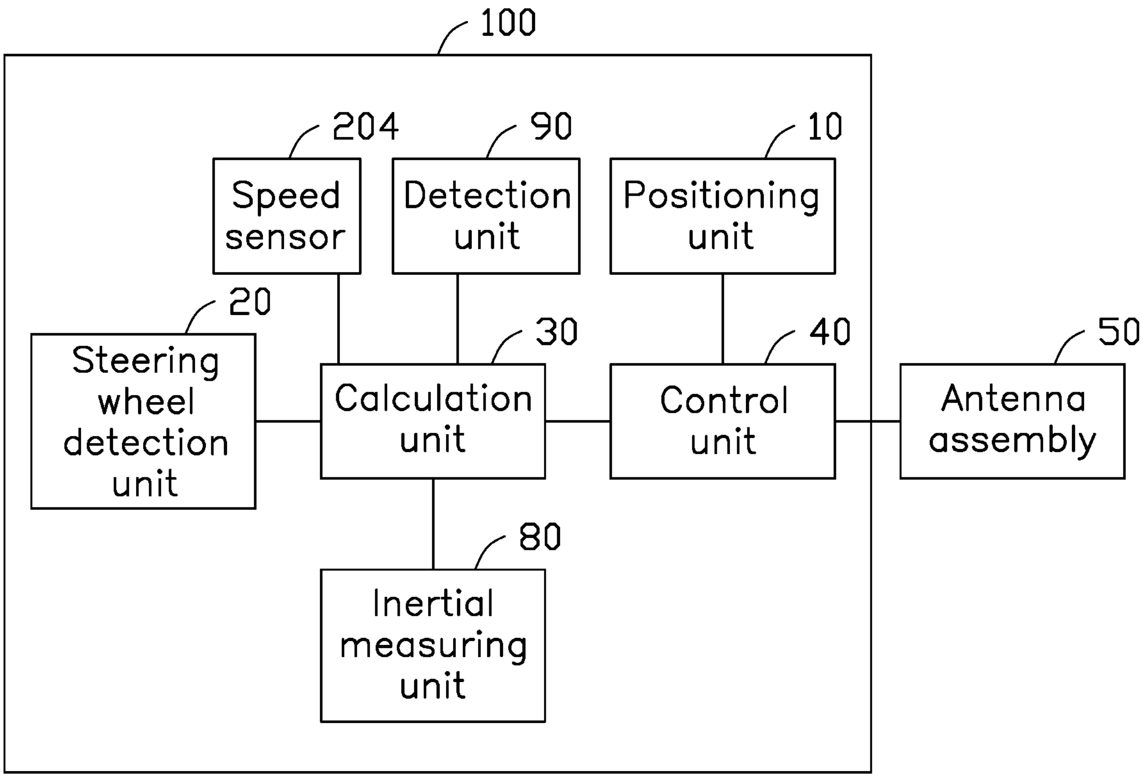
FIG. 8 is a schematic diagram of another embodiment of the antenna phase control device of the present disclosure.

FIG. 8 illustrates an antenna phase control device 300 in accordance with another embodiment of the present disclosure.

The difference between the antenna phase control device 300 provided by the embodiment and the antenna phase control device 200 in FIG. 6 is that: the antenna phase control device 300 further includes a detection unit 90.

The detection unit 90 is electrically connected to the calculation unit 30 and the steering wheel 201, and the detection unit 90 is used to generate an estimated direction information of the moving carrier 70. The calculation unit 30 incorporates the estimated direction information of the moving carrier 70 into the instant rotation information and the speed information of the moving carrier 70 and calculates the compensation phase of the antenna assembly 50.

It can be understood that when the driver wants to change the direction of travel, he will usually check the current driving conditions and surrounding vehicle conditions from the rearview mirror, rearview mirror, front windshield, etc., and turn on the turn signal before turning the steering wheel. Therefore, the driver's intention to change the direction of travel can be estimated by the driver's sight, turn signal status, etc. In other words, before obtaining the instant rotation information of the steering wheel 201 of the moving carrier 70, the driver can be detected to change the direction of line of sight and turn on the turn signal. It can be predicted that the driver will turn the steering wheel and change the direction of travel in accordance with the direction of line of sight and the direction of turn signal illumination.

In some embodiments, the detection unit 90 can connect the steering lamp, the eye tracker, the camera and other devices to generate the estimated direction information. For example, the detection unit 90 can obtain the turn signal status of the moving carrier 70, when the right turn signal is on, the detection unit 90 generates the estimated direction information with the right direction; the detection unit 90 can obtain the driver's line of sight direction information collected by the camera, when the deviation angle between the driver's line of sight and the straight ahead is greater than a threshold, the detection unit 90 generates the estimated direction information of the corresponding direction.

It can be understood that the camera can be installed in different positions of the moving carrier 70, such as the rearview mirror, rearview mirror, front windshield, etc. Therefore, the camera can collect the driver's line of sight information from different angles and improve the detection accuracy of the detection unit 90.

In some embodiments, the calculation unit 30 incorporates the estimated direction information into the instant rotation information and the speed information of the moving carrier 70 and calculates the compensation phase of the antenna assembly 50, including: the calculation unit 30 can obtain the instant rotation information from the steering wheel detection unit 20, if the direction indicated by the instant rotation information is consistent with the direction indicated by the estimated direction information, the calculation unit 30 can first calculate the preset compensation phase. It can be understood that the control unit 40 can adjust the antenna assembly 50 to shift the preset compensation phase in the corresponding direction, thereby reducing the phase transformation time of the antenna assembly 50 and improving the reaction speed of the antenna assembly 50.

Then, the calculation unit 30 calculates the compensation phase of the antenna assembly 50 according to the instant rotation information and the speed information of the moving carrier 70. It should be noted that the compensation phase calculated by the calculation unit 30 needs to subtract the preset compensation phase, the control unit 40 then adjusts the current phase of the antenna assembly 50 according to the result of subtracting the preset compensation phase from the compensation phase.

In some embodiments, the preset compensation phase can be configured as the minimum deflection angle for which the phase value needs to be adjusted. It can be understood that when the moving carrier 70 is driving, turning, uphill and downhill will cause the beam azimuth angle of the antenna assembly 50 to shift, affecting the communication quality between the moving carrier 70 and the satellite 60, in order to maintain the communication quality, the calculation unit 30 can calculate a minimum deflection angle when obtaining the driver's intention to change the driving direction and turning the steering wheel, and the control unit 40 can control the antenna assembly 50 to offset the corresponding phase according to the minimum deflection angle. For example, when the calculation unit 30 receives the estimated direction information such as changing the direction of the line of sight, lighting the turn signal, etc., the calculation unit 30 can calculate the preset compensation phase, the preset compensation phase can be flexibly configured according to the actual situation, for example, the preset compensation phase can be a preset minimum deflection angle (for example, 3 degrees) of the antenna assembly 50, or the preset compensation phase can be the minimum deflection angle obtained according to the driving records of each driver. The control unit 40 can control the antenna assembly 50 to shift the preset compensation phase in the corresponding direction while obtaining the instant rotation information of the steering wheel of the mobile vehicle 70 and calculating the compensation phase, and then control the antenna assembly 50 to offset according to the phase value after subtracting the preset compensation phase from the compensation phase.

In some embodiments, the calculation unit 30 incorporates the estimated direction information into the instant rotation information and the speed information of the moving carrier 70 and calculates the compensation phase of the antenna assembly 50, further including: the calculation unit 30 obtains the preset compensation phase of the antenna assembly 50 according to the correspondence between the preset compensation phase and the estimated direction information. It can be understood that the correspondence between the preset compensation phase and the estimated direction information can be stored in a matching table, and the matching table can be stored in the calculation unit 30 in advance. For example, if the estimated direction information in the matching table indicates 30 degrees to the right, the preset compensation phase corresponding to the estimated direction information is 15 degrees to the right, when the calculation unit 30 receives the estimated direction information indicating that the driver's line of sight is shifted 30 degrees to the right, the calculation unit 30 can obtain the corresponding preset compensation phase according to the matching table, and the control unit 40 can control the antenna assembly 50 to shift 15 degrees to the right.

In another embodiment, the calculation unit 30 can obtain the estimated direction information of lighting the right turn signal from the detection unit 90, before the calculation unit 30 obtains the instant rotation information from the steering wheel detection unit 20, the calculation unit 30 pre-calculates the preset compensation phase indicating the right turn of 1 degree to 180 degrees, alternatively, the calculation unit 30 pre-obtains the preset compensation phase corresponding to the preset compensation phase indicating the right turn of 1 degree to 180 degrees from the matching table. When the calculation unit 30 obtains the instant rotation information from the steering wheel detection unit 20, the calculation unit 30 can obtain the corresponding preset compensation phase from the matching table according to the instant rotation information.

In another embodiment, the calculation unit 30 can obtain the estimated direction information indicating 45 degrees to the front right, before the calculation unit 30 obtains the instant rotation information from the steering wheel detection unit 20, the calculation unit 30 pre-calculates the preset compensation phase indicating the right turn of 1 degree to 45 degrees. When the calculation unit 30 obtains the instant rotation information from the steering wheel detection unit 20, the calculation unit 30 can obtain the corresponding preset compensation phase from the matching table according to the instant rotation information.

In some embodiments, the calculation unit 30 incorporates the estimated direction information into the instant rotation information and the speed information of the moving carrier 70 and calculates the compensation phase of the antenna assembly 50, further including: the calculation unit 30 calculates the preset compensation phase according to the current location information and the road information of the moving carrier 70. The current location information can be provided by the positioning unit 10, and the road information can be provided by the high-precision map. The high-precision map can be stored in the storage unit (not shown in the figure) of the moving carrier 70 or on the cloud server, and the moving carrier 70 obtains the road information in the high-precision map through the communication unit (not shown in the figure). The road information can include the number of lanes, the road curvature, and the road slope, etc. It can be understood that the calculation unit 30 can infer the turning path, the turning angle, the driving direction change, the driving slope change and other situations that the moving carrier 70 will encounter within the preset time period or within the preset range according to the road information and the current location information of the moving carrier 70, and calculate the preset compensation phase accordingly. For example, the calculation unit 30 can learn from the current location information and the road information that the current road will have a 30 degree right turn at a distance of 50 meters ahead and there will be no fork during this period, and the estimated direction information is 30 degrees to the right. In another embodiment, the calculation unit 30 can learn from the current location information and the road information that the gradient of the current road will increase by 10 degrees at a distance of 100 meters ahead, and the estimated direction information is 10 degrees upward. The calculation unit 30 calculates the compensation phase of the antenna assembly 50 according to the estimated direction information, the instant rotation information, and the speed information.

Figure 9:
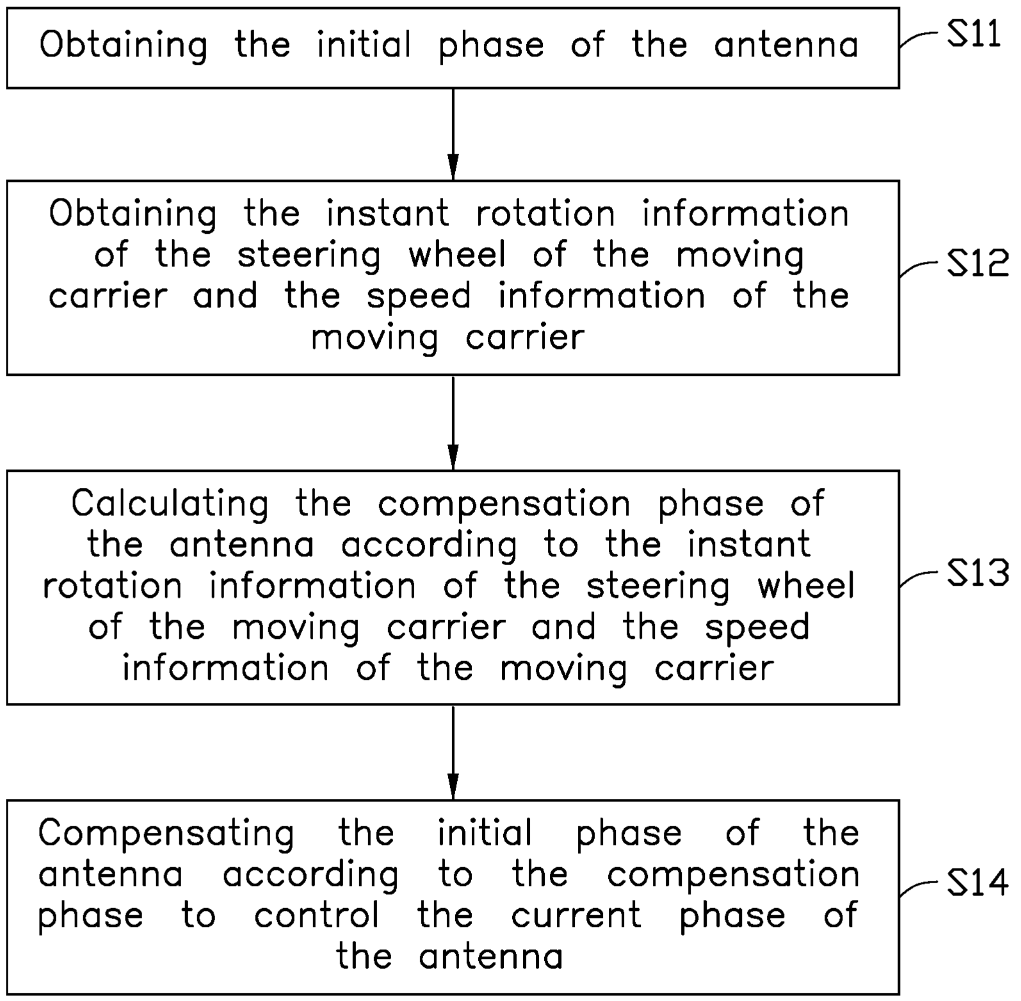
FIG. 9 is a flowchart of an embodiment of the antenna phase control method of the present disclosure.

FIG. 9 is a flowchart of an antenna phase control method in accordance with an embodiment of the present disclosure. The antenna phase control method can be executed by the antenna phase control device 100, and the method includes the following steps:

At step S11, obtaining the initial phase of the antenna.

Specifically, the antenna phase control device 100 can obtain the current location information of the moving carrier 70 and detect the satellite signal strength around the moving carrier 70. Optionally, the antenna phase control device 100 may select the communication satellite corresponding to the strongest satellite signal strength and may further select the communication satellite according to the current location information of the moving carrier 70 to establish the communication connection between the antenna assembly 50 and the communication satellite. After the antenna assembly 50 establishes the communication connection with the communication satellite, the initial phase of the antenna assembly 50 can be obtained. The control unit 40 is configured to obtain current location information of the moving carrier 70 and current location information of the satellite 60 to obtain the initial phase of the antenna.

At step S12, obtaining the instant rotation information of the steering wheel of the moving carrier and the speed information of the moving carrier.

Optionally, the antenna phase control device 100 can obtain the instant rotation information of the steering wheel of the moving carrier 70 by detecting the rotation angle of the steering wheel, and the antenna phase control device 100 can further obtain the speed information of the moving carrier 70 through the speed sensor or according to the motor speed.

At step S13, calculating the compensation phase of the antenna according to the instant rotation information of the steering wheel of the moving carrier and the speed information of the moving carrier.

In the embodiment, the antenna phase control device 100 can calculate the compensation phase of the antenna assembly 50 according to the instant rotation information of the steering wheel of the moving carrier 70 and the speed information of the moving carrier 70. It can be understood that when the direction or the speed of the moving carrier 70 changes during movement, the radiation direction of the antenna assembly 50 may change, the antenna phase control device 100 can calculate the compensation phase of the antenna assembly 50 according to the instant rotation information of the steering wheel of the moving carrier 70 and the speed information of the moving carrier 70, to compensate the initial phase of the antenna assembly 50, adjust the radiation direction of the antenna assembly 50 to improve the communication quality between the antenna assembly 50 and the satellite 60.

At step S14, compensating the initial phase of the antenna according to the compensation phase to control the current phase of the antenna.

Specifically, the antenna phase control device 100 can obtain the initial phase of the antenna assembly 50, and adjust the phase of the antenna assembly 50 according to the compensation phase and the initial phase to adjust the radiation direction of the antenna assembly 50 and enhance the communication quality between the antenna assembly 50 and the satellite 60.

Figure 10:
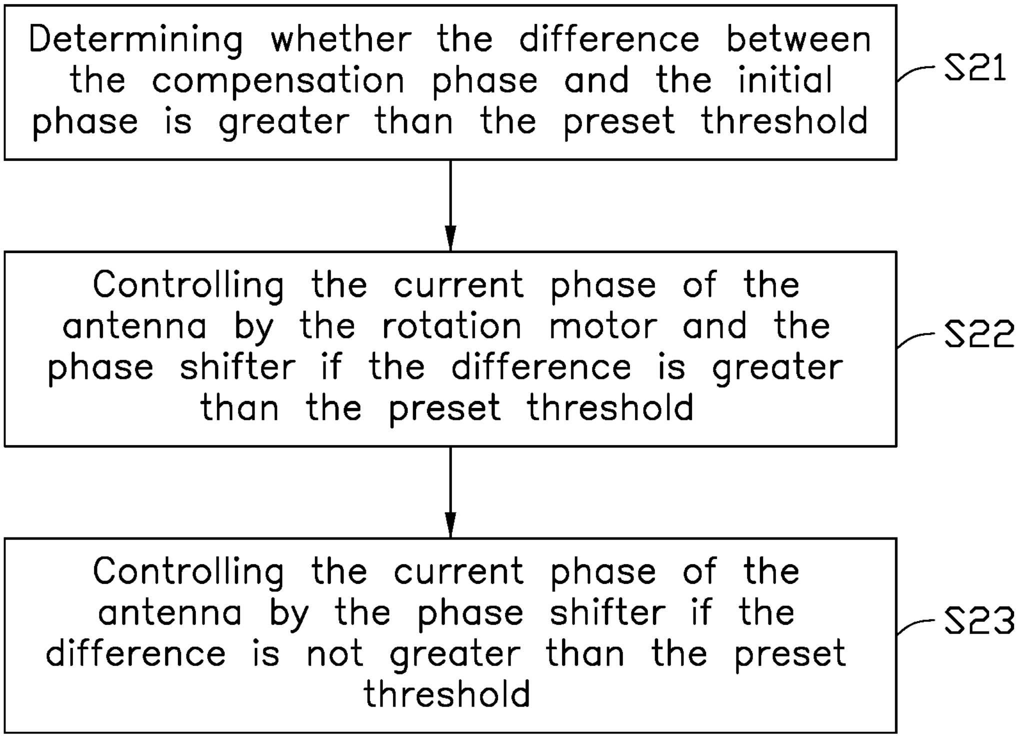
FIG. 10 is the flowchart of step S14 in the antenna phase control method in FIG. 9.

FIG. 10 is a flowchart of step S14 in the antenna phase control method. Step S14 includes the following steps:

At step S21, determining whether the difference between the compensation phase and the initial phase is greater than the preset threshold.

It can be understood that the antenna phase control device 100 can determine whether the difference between the compensation phase and the initial phase is greater than the preset threshold after calculating the compensation phase.

At step S22, controlling the current phase of the antenna by the rotation motor and the phase shifter if the difference is greater than the preset threshold.

It can be understood that both the rotation motor 501 and the phase shifter 502 are used to adjust the phase of the antenna 503. Specifically, the rotation motor 501 can control the rotation of the antenna 503 to adjust the phase of the antenna 503, so as to greatly adjust the radiation direction of the antenna 503. The phase shifter 502 can directly adjust the phase of the antenna 503, so as to slightly adjust the radiation direction of the antenna 503.

At step S23, controlling the current phase of the antenna by the phase shifter if the difference is not greater than the preset threshold.

It can be understood that if the difference between the compensation phase and the initial phase is not greater than the preset threshold, the antenna phase control device 100 can adjust the phase of the antenna 503 only through the phase shifter 502 to adjust the radiation direction of the antenna 503.

Figure 11:
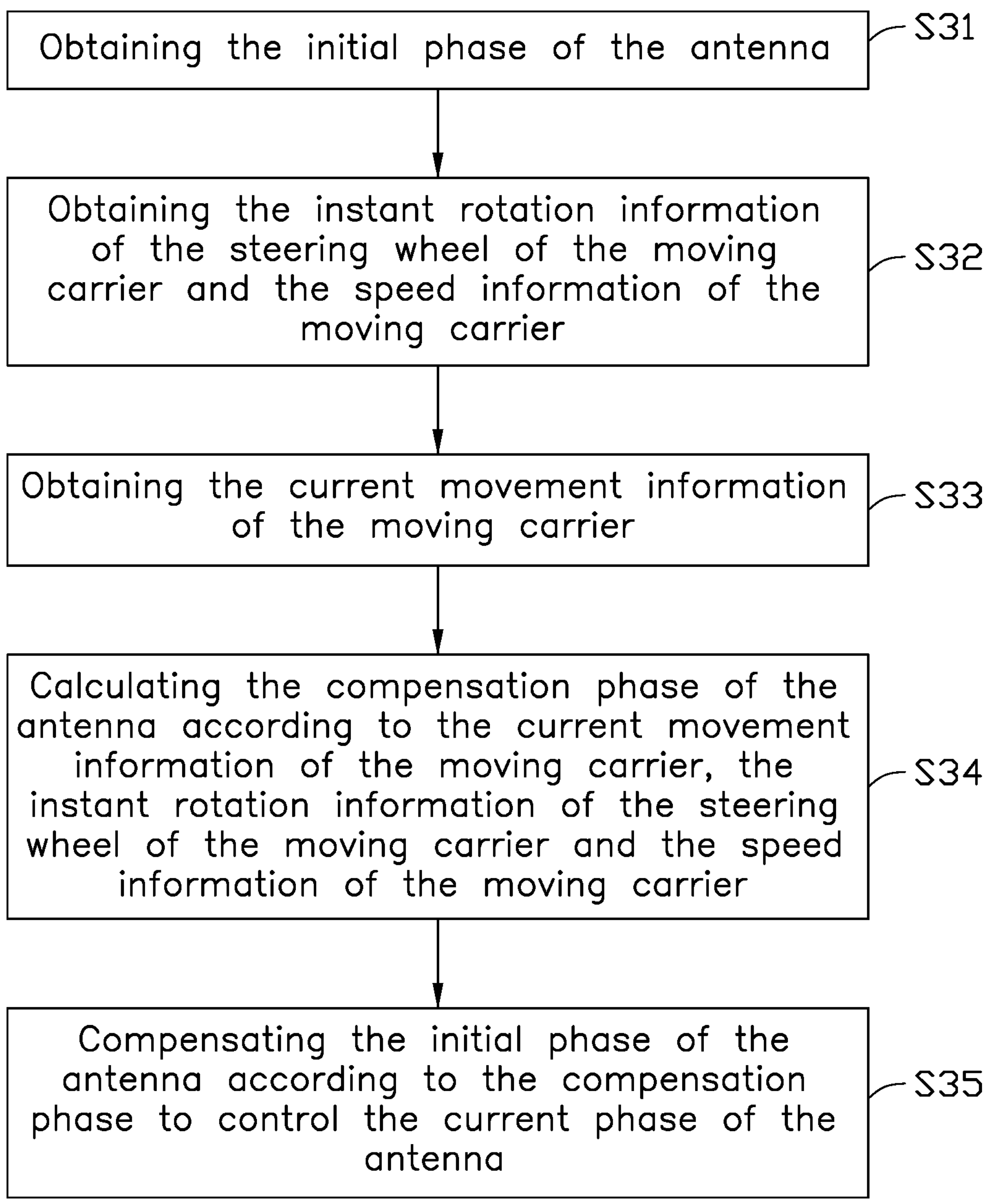
FIG. 11 is a flowchart of another embodiment of the antenna phase control method of the present disclosure.

FIG. 11 is a flowchart of an antenna phase control method in accordance with another embodiment of the present disclosure. The antenna phase control method can be executed by the antenna phase control device 300, and the method includes the following steps:

At step S31, obtaining the initial phase of the antenna.

It can be understood that in this embodiment, step S31 is the same as step S11 in FIG. 9, which will not be repeated here.

At step S32, obtaining the instant rotation information of the steering wheel of the moving carrier and the speed information of the moving carrier.

It can be understood that in this embodiment, step S32 is the same as step S12 in FIG. 9, which will not be repeated here.

At step S33, obtaining the current movement information of the moving carrier.

In the embodiment, the current movement information includes a current angle information of the moving carrier 70.

In some embodiments, the antenna phase control device 300 includes an accelerometer, a gyroscope and a magnetometer. The accelerometer is used to measure the current acceleration of the moving carrier 70 (including gravity acceleration), the gyroscope is used to measure the angular velocity and the direction angle of the moving carrier 70, and the magnetometer is used to measure the magnetic field strength and the direction at the location of the moving carrier 70.

In some embodiments, the angle information includes the pitch angle, the slope angle and the azimuth information of the moving carrier 70.

At step S34, calculating the compensation phase of the antenna according to the current movement information, the instant rotation information and the speed information.

It can be understood that the calculation unit 30 can calculate the compensation phase of the antenna assembly 50 according to the current movement information, the instant rotation information and the speed information of the moving carrier 70.

At step S35, compensating the initial phase of the antenna according to the compensation phase to control the current phase of the antenna.

It can be understood that in this embodiment, step S35 is the same as step S14 in FIG. 9, which will not be repeated here.

Figure 12:
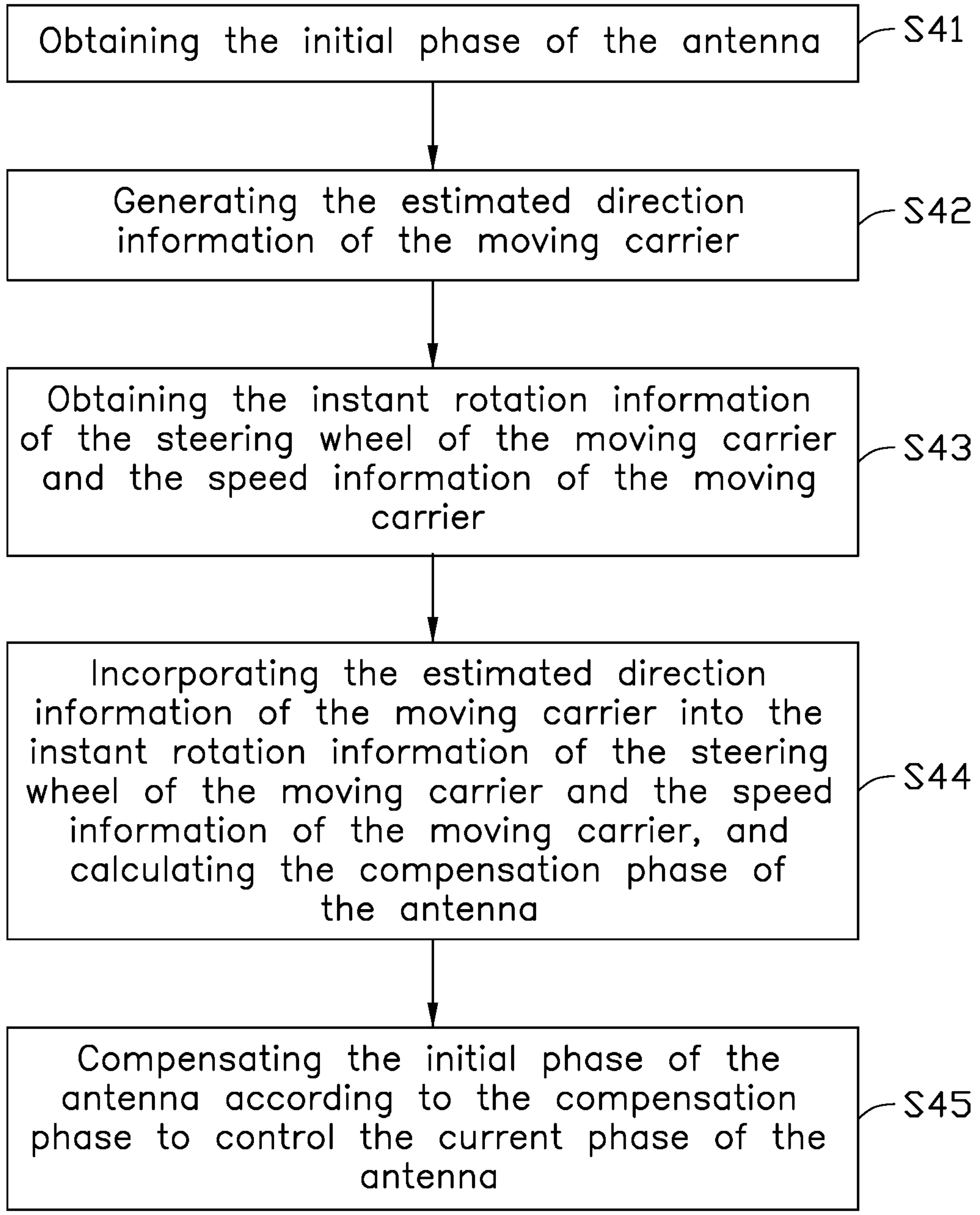
FIG. 12 is a flowchart of another embodiment of the antenna phase control method of the present disclosure.

FIG. 12 is a flowchart of an antenna phase control method in accordance with another embodiment of the present disclosure. The antenna phase control method can be executed by the antenna phase control device 300, and the method includes the following steps:

At step S41, obtaining the initial phase of the antenna.

It can be understood that in this embodiment, step S41 is the same as step S11 in FIG. 9, which will not be repeated here.

At step S42, generating the estimated direction information.

In the embodiment, the detection unit 90 can connect the steering lamp, the eye tracker, the camera and other devices to generate the estimated direction information. For example, the detection unit 90 can obtain the on or off status of the turn signal lamp, when the right turn signal lamp is on, the detection unit 90 generates the estimated direction information with the right direction; the detection unit 90 can obtain the driver's line of sight direction information collected by the camera, when the deviation angle between the driver's line of sight and the straight ahead is greater than a threshold, the detection unit 90 generates the estimated direction information of the corresponding direction.

At step S43, obtaining the instant rotation information of the steering wheel of the moving carrier and the speed information of the moving carrier.

It can be understood that in this embodiment, step S43 is the same as step S12 in FIG. 9, which will not be repeated here.

At step S44, incorporating the estimated direction information into the instant rotation information and the speed information of the moving carrier, and calculating the compensation phase of the antenna.

In some embodiments, the calculation unit 30 can obtain the instant rotation information from the steering wheel detection unit 20, if the direction indicated by the instant rotation information is consistent with the direction indicated by the estimated direction information, the calculation unit 30 can first calculate the preset compensation phase. It can be understood that the control unit 40 can adjust the antenna assembly 50 to shift the preset compensation phase in the corresponding direction, thereby reducing the phase transformation time of the antenna assembly 50 and improving the reaction speed of the antenna assembly 50.

Then, the calculation unit 30 calculates the compensation phase of the antenna assembly according to the instant rotation information and the speed information of the moving carrier 70. It should be noted that the compensation phase calculated by the calculation unit 30 needs to subtract the preset compensation phase, the control unit 40 then adjusts the current phase of the antenna assembly 50 according to the result of subtracting the preset compensation phase from the compensation phase.

At step S45, compensating the initial phase of the antenna according to the compensation phase to control the current phase of the antenna.

It can be understood that in this embodiment, step S45 is the same as step S14 in FIG. 9, which will not be repeated here.

The antenna phase control method and device provided in the present disclosure can calculate the compensation phase of the antenna according to the instant rotation information of the steering wheel of the moving carrier and the speed information of the moving carrier, so as to dynamically adjust the radiation direction of the antenna.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna phase control method applied to an antenna phase control device, the antenna being disposed on a moving carrier to communicate with a satellite, and the antenna phase control method comprising:

obtaining an initial phase of the antenna;

generating estimated direction information of the moving carrier;

obtaining instant rotation information of a steering wheel of the moving carrier and speed information of the moving carrier;

calculating a preset compensation phase according to the instant rotation information and the estimated direction information, calculating a compensation phase according to the instant rotation information and the speed information; and calculating a phase difference between the preset compensation phase and the compensation phase, compensating the initial phase of the antenna according to the phase difference to control a current phase of the antenna.

2. The antenna phase control method according to claim 1, further comprising:

obtaining current location information of the moving carrier and current location information of the satellite to obtain the initial phase of the antenna.

3. The antenna phase control method according to claim 1, further comprising:

obtaining current movement information of the moving carrier, and calculating the compensation phase of the antenna according to the current movement information, the instant rotation information and the speed information of the moving carrier.

4. The antenna phase control method according to claim 3, wherein the current movement information comprises current angle information of the moving carrier.

5. The antenna phase control method according to claim 1, further comprising:

detecting a turn signal status of the moving carrier to generate estimated direction information of the moving carrier; and incorporating the estimated direction information of the moving carrier into the instant rotation information of the steering wheel of the moving carrier and the speed information of the moving carrier and calculating the compensation phase of the antenna.

6. The antenna phase control method according to claim 1, further comprising:

detecting a driver's line of sight direction to generate the estimated direction information of the moving carrier.

7. The antenna phase control method according to claim 6, further comprising:

incorporating the estimated direction information of the moving carrier into the instant rotation information of the steering wheel of the moving carrier and the speed information of the moving carrier to calculate the compensation phase of the antenna.

8. The antenna phase control method according to claim 1, further comprising:

determining whether a difference between the compensation phase and the initial phase is greater than a preset threshold; and controlling the current phase of the antenna by a rotation motor if the difference is greater than the preset threshold.

9. The antenna phase control method according to claim 1, further comprising:

determining whether a difference between the compensation phase and the initial phase is greater than a preset threshold; and controlling the current phase of the antenna by a phase shifter if the difference is greater than the preset threshold.

10. The antenna phase control method according to claim 1, further comprising:

determining whether a difference between the compensation phase and the initial phase is greater than a preset threshold; and controlling current phase of the antenna by a phase shifter if the difference is less than or equal to the preset threshold.

11. An antenna phase control device configured to adjust an initial phase of an antenna, the antenna being disposed on a moving carrier to communicate with a satellite, and the antenna phase control device comprising:

a steering wheel detection unit configured to obtain instant rotation information of a steering wheel of the moving carrier;

a speed sensor configured to obtain speed information of the moving carrier;

a detection unit configured to generate estimated direction information of the moving carrier;

a calculation unit electrically connected to the steering wheel detection unit and configured to calculate a preset compensation phase according to the instant rotation information and the estimated direction information, calculate a compensation phase according to the instant rotation information and the speed information, and calculate a phase difference between the preset compensation phase and the compensation phase; and a control unit electrically connected to the antenna and the calculation unit, the control unit configured to compensate the initial phase of the antenna according to the phase difference to control a current phase of the antenna.

12. The antenna phase control device according to claim 11, wherein the control unit is further configured to obtain current location information of the moving carrier and current location information of the satellite to obtain the initial phase of the antenna.

13. The antenna phase control device according to claim 11, further comprising:

an inertial measuring unit electrically connected to the calculation unit and configured to obtain current movement information of the moving carrier, wherein the calculation unit calculates the compensation phase of the antenna according to the current movement information, the instant rotation information and the speed information of the moving carrier.

14. The antenna phase control device according to claim 13, wherein the current movement information comprises current angle information of the moving carrier.

15. The antenna phase control device according to claim 11, further comprising:

the detection unit electrically connected to the calculation unit and configured to detect a turn signal status of the moving carrier to obtain the estimated direction information of the moving carrier;

wherein the calculation unit incorporates the estimated direction information of the moving carrier into the instant rotation information of the steering wheel of the moving carrier and the speed information of the moving carrier to calculate the compensation phase of the antenna.

16. The antenna phase control device according to claim 11, further comprising:

the detection unit electrically connected to the calculation unit and configured to detect a driver's line of sight direction to generate the estimated direction information of the moving carrier.

17. The antenna phase control device according to claim 16, wherein the calculation unit incorporates the estimated direction information of the moving carrier into the instant rotation information of the steering wheel of the moving carrier and the speed information of the moving carrier to calculate the compensation phase of the antenna.

18. The antenna phase control device according to claim 11, wherein the control unit is further configured to determine whether a difference between the compensation phase and the initial phase is greater than a preset threshold and control the current phase of the antenna by a rotation motor if the difference is greater than the preset threshold.

19. The antenna phase control device according to claim 11, wherein the control unit is further configured to determine whether a difference between the compensation phase and the initial phase is greater than a preset threshold and control the current phase of the antenna by a phase shifter if the difference is greater than the preset threshold.

20. The antenna phase control device according to claim 11, wherein the control unit is further configured to determine whether a difference between the compensation phase and the initial phase is greater than a preset threshold and control the current phase of the antenna by a phase shifter if the difference is less than or equal to the preset threshold.

* * * * *